F. E. DAVIS AND W. W. CAMERON.
TRACTOR PLOW.
APPLICATION FILED APR. 18, 1913.
1,347,992.
Patented July 27, 1920.
6 SHEETS—SHEET 4.
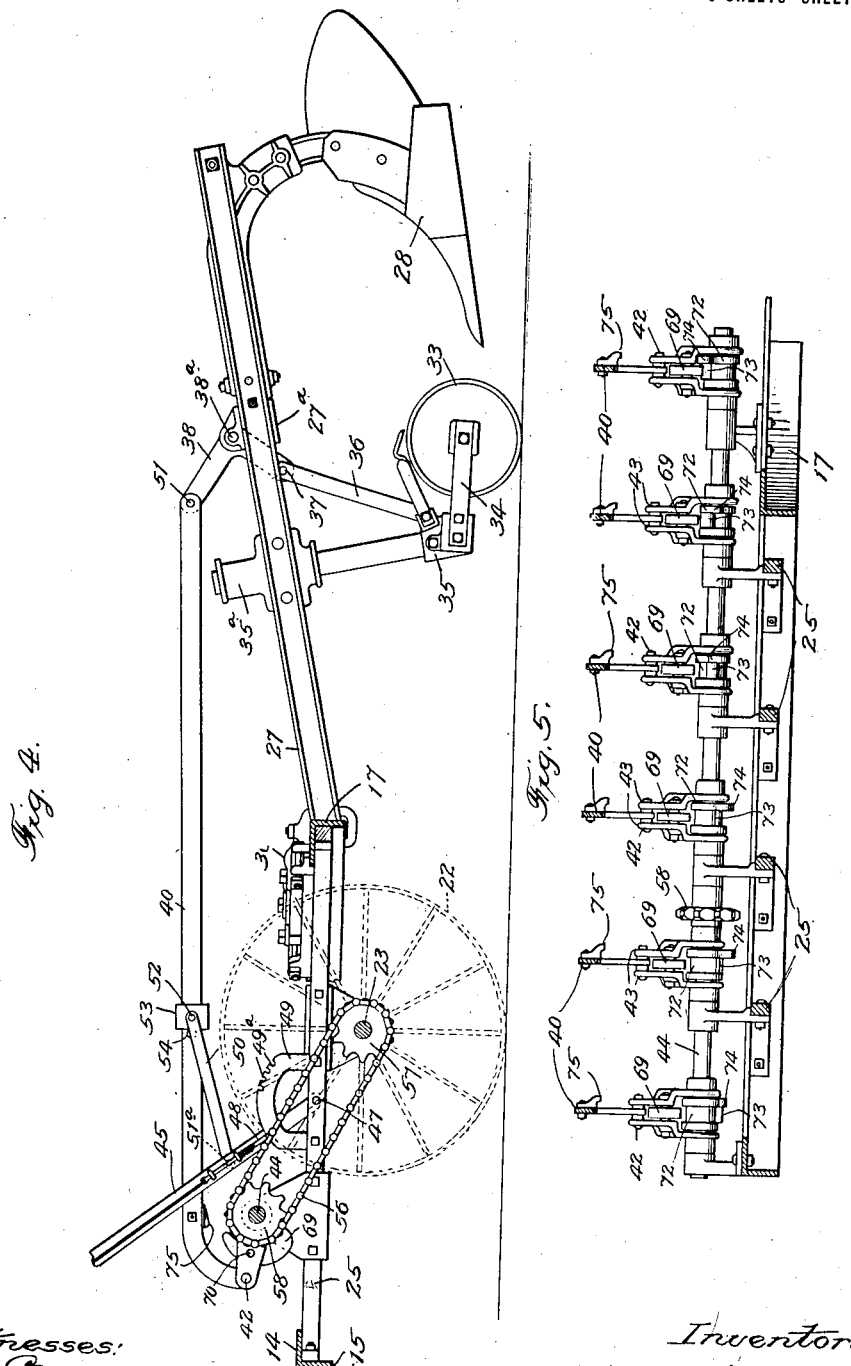

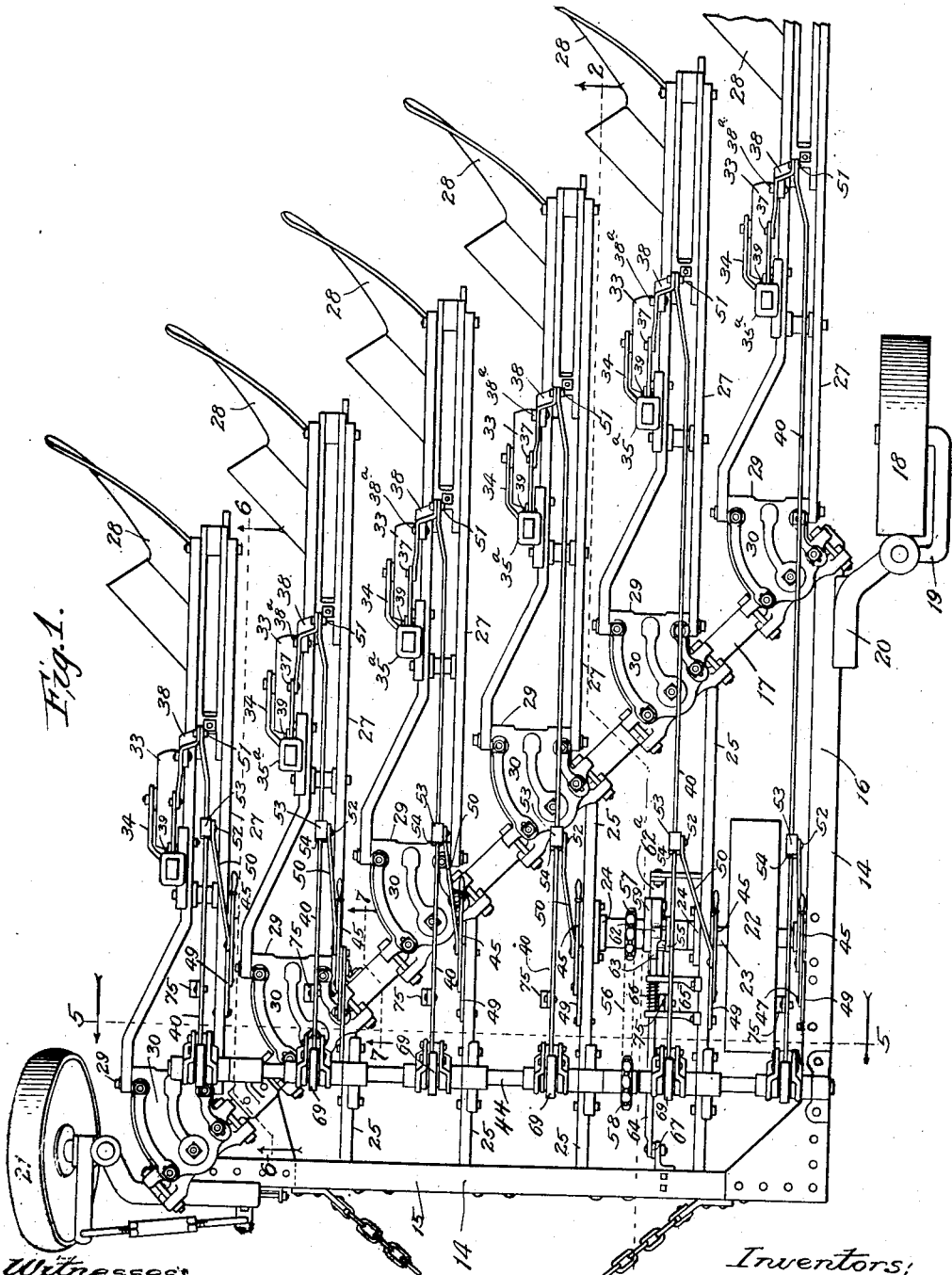

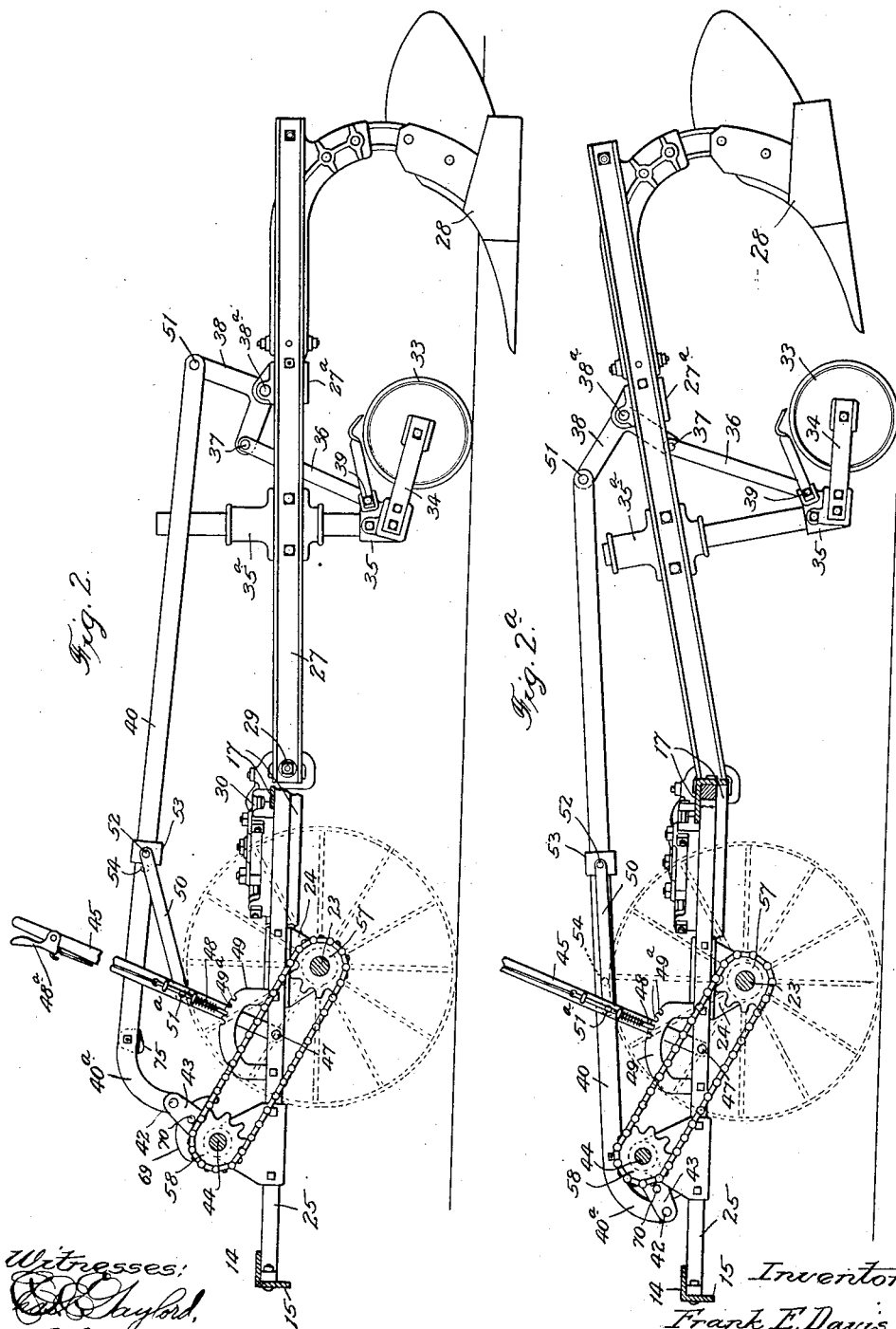

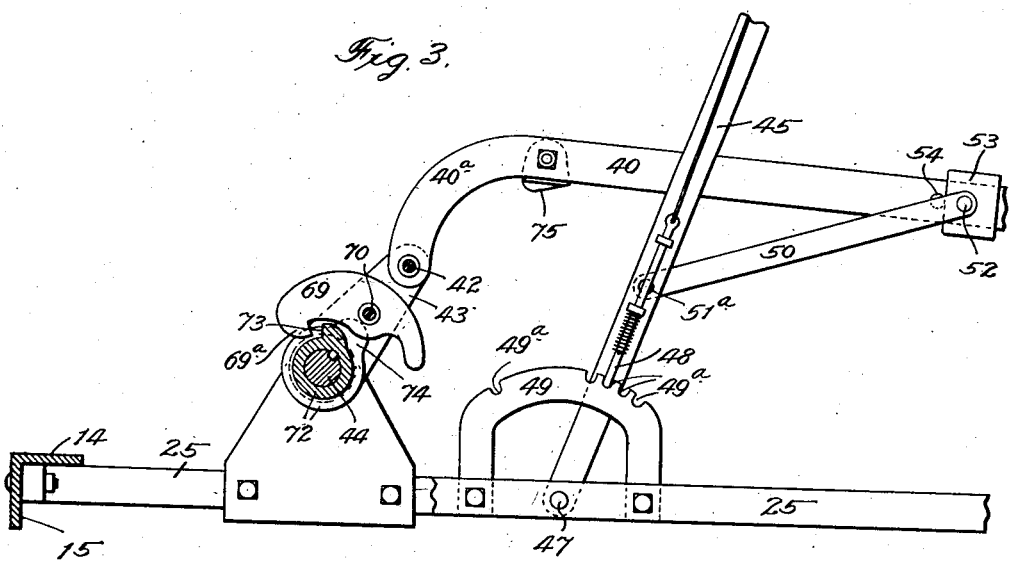
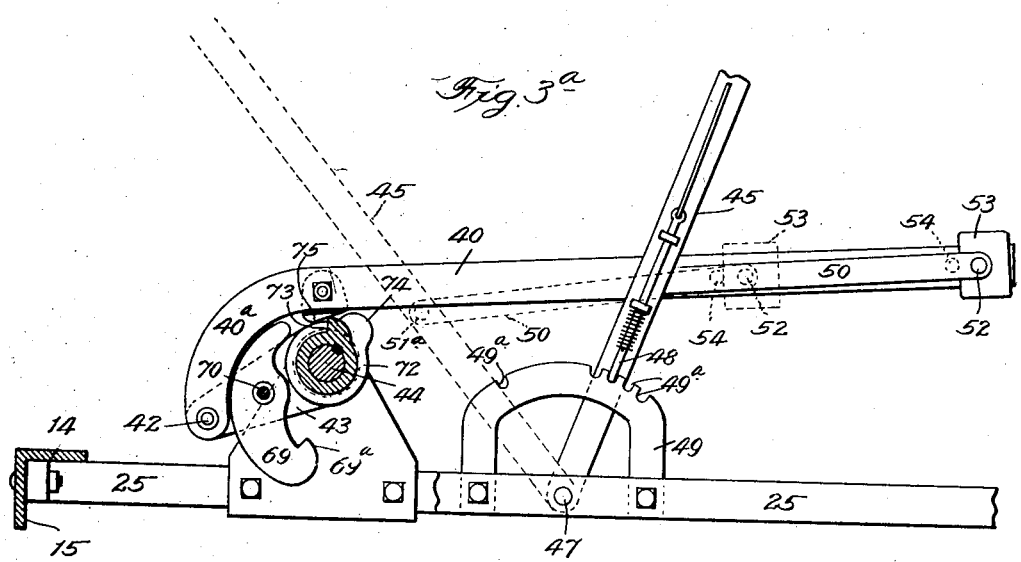

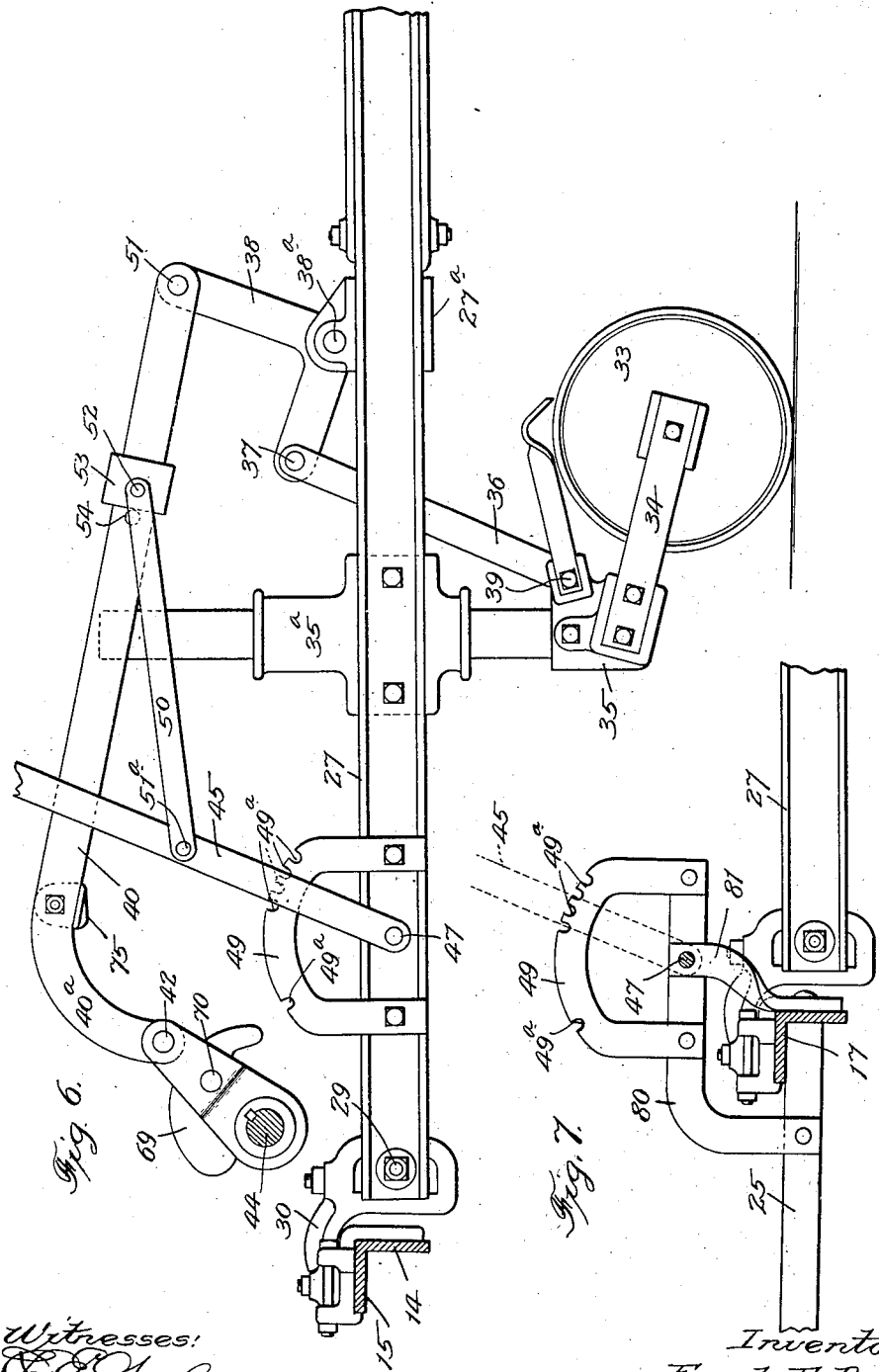

F. E. DAVIS AND W. W. CAMERON.
TRACTOR PLOW.
APPLICATION FILED APR. 18, 1913.
1,347,992.
Patented July 27, 1920.
6 SHEETS—SHEET 6.
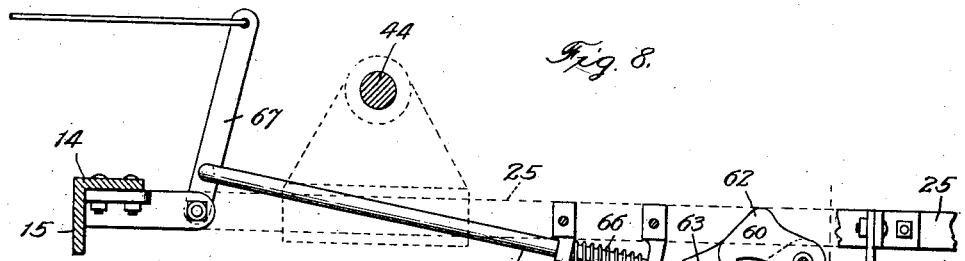
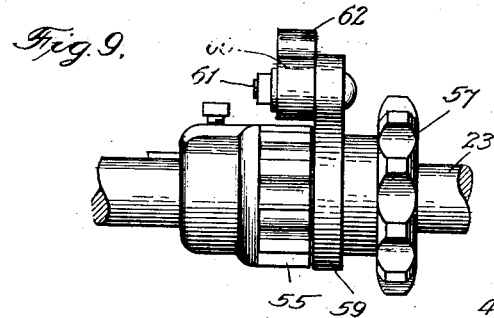
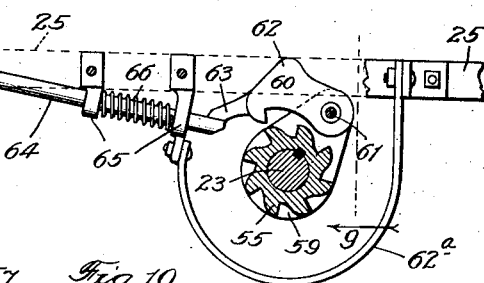
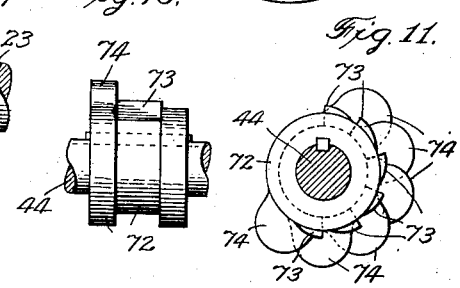
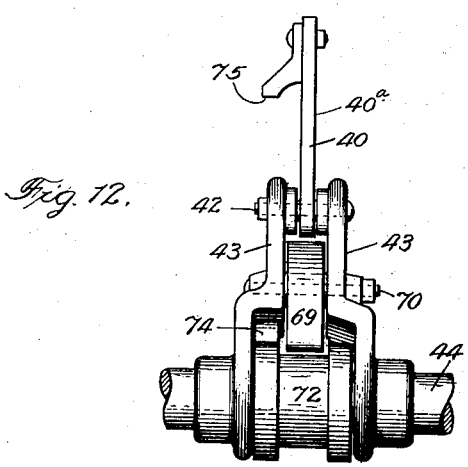

UNITED STATES PATENT OFFICE.

FRANK E. DAVIS AND WILLIAM W. CAMERON, OF LA CROSSE, WISCONSIN, ASSIGNORS TO LA CROSSE PLOW CO., OF LA CROSSE, WISCONSIN, A CORPORATION OF WISCONSIN.

TRACTOR-PLOW.

1,347,992.  Specification of Letters Patent.  Patented July 27, 1920.

Application filed April 18, 1913. Serial No. 761,928.

*To all whom it may concern:*

Be it known that we, FRANK E. DAVIS and WILLIAM W. CAMERON, both residents of La Crosse, in the county of La Crosse and State of Wisconsin, have invented new and useful Improvements in Tractor-Plows, of which the following is a full, clear, and exact description.

The invention relates to plows and more particularly to tractor plows, in which provision is made for raising the plows by power derived from one of the traction-wheels.

The invention designs to provide improved power-operated plow-shifting mechanism in which the depth of the cut of the plows may be readily regulated.

A further object of the invention is to provide power-operated lifting-mechanism which will be self-locking to hold the plows in raised position to avoid the necessity of providing separate latching-devices for securing the plows in said position.

A further object of the invention is to provide improved depth-regulating mechanism which arrests the lowering of the plows and leaves them free at all times to be raised by power or manually.

Another object of the invention is to provide improved manually operable means for the beam-lifting connections.

Another object of the invention is to provide improved power-operated lifting-mechanism which is simple in construction and efficient in operation. Other objects of the invention will be apparent from the description thereof.

The invention consists in the several novel features hereinafter set forth and more particularly defined by claims at the conclusion hereof.

In the drawings: Figure 1 is a plan of a plow embodying the invention. Fig. 2 is a vertical section taken on line 2—2 of Fig. 1, the plow being lowered. Fig. 2ᵃ is a similar view, the plow being raised. Fig. 3 is a detail side elevation showing the linkage in position assumed when the plow-beam, controlled thereby, is lowered. Fig. 3ᵃ is a similar view showing the parts when the linkage has been operated to lift the plow-beam by the power-operated mechanism. Fig. 4 is a similar view showing the plow-beam and the shifting mechanism in position assumed when the beam has been raised by the hand-lever without causing the linkage to cross its "dead-center," so the plow-beam will drop automatically (without operation of the power-lift) when the hand-lever is released. Fig. 5 is a section taken on line 5—5 of Fig. 1. Fig. 6 is a section taken on line 6—6 of Fig. 1. Fig 7 is a section taken on line 7—7 of Fig. 1. Fig. 8 is a longitudinal section showing the clutch for driving the operating-shaft and the automatic throw-out for controlling the clutch. Fig. 9 is a rear elevation of the clutch. Fig. 10 is a detail of one of the collars with the lifting-tooth and the tappet for releasing the lifting-connection. Fig. 11 is a detail illustrating the relative position of the tappets and the lifting teeth on the plow-operating shaft. Fig. 12 is a detail front view of one of the lifting-connections.

The plow-frame 14 comprises a front rail 15, a side rail 16 and a diagonal rail 17 all of which are rigidly secured together by suitable plates or devices. A land-wheel 18 carries a standard 19 which is suitably connected to a bracket 20 which is secured to the rear end of the frame 14. A furrow-wheel 21 at one side of the frame is suitably connected to the front end of the frame at one side thereof, and a traction-wheel 22 supports the opposite front corner of the frame. Traction-wheel 22 is secured to a shaft 23 which is mounted in suitable bearings 24 which are secured to frame 14, on bars 16 and 25 thereof. Said shaft serves to operate the plow-lifting mechanism by power derived from the traction-wheel. The plow may be connected to a tractor by any suitable means, as well understood in the art.

The plow comprises a series of plow-beams 27 arranged in diagonal succession to operate successively in the ground. A plow share 28 is suitably connected to each beam. The front of each beam 27 is pivotally connected as at 29 to a bracket 30 which is secured to the rail 17 of the frame 14 to permit the rear end of the beam and the plow carried thereby to be raised or lowered. A gage-wheel 33 is provided for each plow-beam and carries a fork 34 on the lower end of a standard 35 which is slidably held in a bracket 35ᵃ secured to said beam.

The plow-shifting mechanism for each beam comprises a link 36 which is pivoted as at 39, to the lower end of the gage-wheel standard, and at 37 to one arm of a bell-crank lever 38 which is pivoted to a lug 27ª, as at 38ª, and a link 40 pivoted to the other arm of said bell-crank at 51. Link 40 has its front end curved downwardly and pivoted as at 42, to an arm 43 which is pivoted on a shaft 44. The pivotal connections of arm 43, link 40, and lever 38 are relatively disposed to permit the linkage to pass into "dead-center" relation and cause the plow-beam to be automatically locked or held in raised position, as shown in Fig. 2ª.

A depth-regulating device is provided for each plow-beam and each comprises a hand-lever 45 which is pivoted at 47 to a frame-bar 25 and carries a spring-pressed lock 48 which is releasable by a finger-lever 48ª, a notched rack 49 for said lock, a link 50 having its front end pivoted as at 51ª to lever 45, and having its rear end pivoted as at 52 to a slide 53 on link 40, of the plow-shifting linkage, and a stop-pin 54 on said link 40.

Rack 49 is provided with a series of notches 49ª disposed to lock hand-lever 45 in position to variably limit the depth of the plow-shares when they are in the soil. By locking hand-lever 45 in the different notches 49ª, slide 53 may be shifted forwardly or backwardly to correspondingly shift stop 54 and limit the rearward movement of link 40 to regulate the depth of the plow-shares when working in the soil.

Hand-lever 45 is adapted to raise the plow-beam independently of the power-operated shaft, as may at times be desired, either in event the power-operated mechanism becomes inoperative, or when the plow is not in motion. Forward movement of lever 45 will cause link 50 to operate slide 53 which will engage stud 54 and operate link 40 in one direction only. If, therefore, the linkage has crossed its "dead-center," lever 45 will be ineffective to operate the link rearwardly to lower the plow. Rack 49 is provided with a notch 49ª which is disposed to lock the hand-lever 45, before the linkage crosses its dead-center, as shown in Fig. 4, when the hand-lever is used to raise the plow.

When hand-lever 45 is thus locked, the weight of the plow and beam will cause them to drop automatically as soon as the hand-lever is unlocked and released. In this manner, the hand-lever is adapted to raise the plow, and the linkage is free to be operated, independently of the hand-lever by the power-lifting mechanism hereinafter set forth. The hand-lever is thus used when the plow is not in motion.

Hand-lever 45, when kept unlocked from rack 49, may also be operated forwardly of notch 49ª, as indicated by dotted lines in Fig. 3ª, to shift the linkage across its "dead-center" and cause it to be automatically locked to hold the plow raised. From this position, the linkage will be operated rearwardly to cross its "dead-center" by the power-operated mechanism hereinafter set forth. The shifting of the linkage across its "dead-center" by the hand-lever is sometimes desirable when the plows would run too close to the end of the row to be raised by power, and when the plows are to be lowered on the return trip by power-mechanism.

It will be observed that this depth-regulating device permits the plow-shifting linkage to be operated by power to lift or lower the plows independently of the hand-lever, and that the hand-lever may be used to raise the plow either to a point where the linkage will be automatically locked by crossing the "dead-center" or where the plows will be free to drop as soon as the lever is released from notch 49ª.

The notched racks 49 for the hand-lever locks are secured to frame-bars 25 except those on the two right-hand plows. The rack for the plow at the right side of the machine is secured to the plow-beam 27, as illustrated in Fig. 6. This makes it unnecessary to provide a special supporting-structure for the rack at that end of the machine at which the diagonal bar 17 is secured to the front rail of the frame. The rack 49 for the beam next to the right-hand beam is secured to a bar 80 which has its front end secured to one of the frame-bars 25 and is secured to the diagonal bar 17 by a small brace 81.

A ratchet-wheel 55 is fixed on shaft 23 and is constantly driven by traction-wheel 22. A driving-connection between shaft 23 and the plow-operating shaft 44 comprises a sprocket-chain 56, a sprocket-wheel 57 which is loose on shaft 23 and a sprocket-wheel 58 fixed on shaft 44. Sprockets 57 and 58 are provided with the same number of teeth so that one revolution of sprocket 57 will impart one revolution to the sprocket 58. An automatically releasable clutch comprises an arm 59 on sprocket 57, and a dog 60 pivoted as at 61 to the outer end of said arm. A weighted portion 62 on dog 60 normally throws the dog into engagement with ratchet 55 and an abutment 63 is formed on said dog and is adapted to engage a controller-rod 64 and be arrested thereby after one complete revolution of the clutch to automatically disengage the dog from the ratchet. A fixed guide 62ª serves to hold the dog in engagement with the ratchet during a portion of each revolution of the dog. Controller-rod 64 is slidably mounted in guides 65 on the frame, and a spring 66 serves to normally press the rear end of said rod into the path of abutment 63. The front end of rod 64 is pivoted to a controller-lever 67 which is adapted to be operated by a cable or rod extending to the tractor. When lever 67 is moved forwardly, rod 64 will be withdrawn from the path of abutment 63, dog 60 will drop into engagement with ratchet 55, and the clutch will be driven one complete revolution, at the end of which, abutment 63 will be arrested by controller-rod 64 to disconnect the dog from ratchet-wheel 55. Resultantly, each time lever 67 is operated, the clutch will drive chain 56 to drive the plow-shifting shaft 44 one complete revolution at the end of which, the clutch will be automatically thrown out of action.

A dog 69 is pivoted to each arm 43 as at 70, and said arm is preferably formed of dual sections between which the dog is held. Between the hubs of the arm-sections, a collar 72 which is provided with a tooth 73 is fixed on shaft 44 to engage dog 69 and shift arm 43 to lift the plow-beam. When the plow-beam is lowered, the end 69ᵃ of dog 69 is in the path of tooth 73. Tooth 73 serves to engage the end of dog 69 and to shift arm 43 and its plow-shifting linkage to raise the plow-beams. A tappet 74 on one side of collar 72 is adapted to engage a lug 75 which is secured to link 40 and serves to lift said link a short distance. Said tappet serves as power-operated mechanism for moving arm 43 to shift link 40 across its "dead-center" so that the plows and beams will be released to fall by gravity.

Assuming the plow-shifting mechanism to be in the position shown in Fig. 2ᵃ and the plows raised, the latter will be held by the self-locking or "dead-center" relation of the lifting-linkage. When it is desired to lower the plows, lever 67 will be pulled forwardly to render the clutch operative and cause the clutch to drive shaft 44 one complete revolution, during which the tappet 74 will engage lug 75 to lift the curved end of link 40 above the dead-center, and arm 43 will be swung upwardly, so that the weight of the beam and plow will be applied to cause the plow to drop, the lifting-linkage being free to permit this movement when the linkage crosses its dead-center.

When the plows are in the ground, as shown in Fig. 2, and it is desired to raise them, the operator will again pull lever 67 forward to permit the clutch-dog 60 to engage ratchet 55 and again cause shaft 44 to be driven one complete revolution and during this movement, tooth 73 will catch dog 69 and swing arm 43 forwardly to operate link 40 and raise the plow. The lower end of dog 69 is of sufficient weight to swing automatically out of engagement with tooth 73 when curved end 40ᵃ of link 40 has passed the dead center; and when the dog is released the tail of the dog contacts with link 40 to prevent the dog from swinging back into engagement with tooth 73, until the link 40 has been raised during the succeeding lowering operation. Resultantly, the dog will be released from shaft 44 as soon as the lifting-mechanism has raised its plow.

The plows are disposed to operate in succession and the operating device for the several plow-shifting mechanisms is operated successively to cause the plows to enter the ground substantially on a line transverse to the line of draft and to cause them to be correspondingly raised.

For the purpose of causing the plows to be successively raised, the teeth 73 for the several shifting mechanisms are set in rotative succession on shaft 44, as shown in Fig. 11, and for the purpose of successively releasing the shifting mechanisms, tappets 74 are also placed in rotative succession on the said shaft. Resultantly, one revolution of said shaft will successively operate tappets 74 to release links 40 and will cause them to be shifted in proper succession to cause the plows to penetrate the ground on a transverse line. In similar manner, a revolution of shaft 44 will successively operate the several lifting-mechanisms to lift the plows out of the ground. The same clutch serves to alternately operate the shaft 44, to lift and release the lifting mechanisms.

The invention thus exemplifies simple power-operated lifting-mechanism for plows. A single controlling device serves to control the operation of the clutch to operate the lifting shaft, either for raising the plows or for lowering them. The "dead-center" linkage renders special latching-devices unnecessary. The hand-levers may be individually operated to regulate the depth of the cuts and may also be operated to raise the plows in event the power-lifting-mechanisms become inoperative. The latter operates to raise and lower the plows independently of the depth-regulating mechanism.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In a plow, the combination with a frame, carrying-wheels and a plow carrying structure, of a lifting linkage, a shaft, means for driving the shaft, means operated by the shaft for shifting the linkage across its dead center to cause it to automatically hold the structure raised and a device operated by said shaft for shifting the linkage across the dead-center to release the structure and permit it to descend into operative position.

2. In a plow, the combination with a frame, carrying-wheels, and a plow-carrying structure, of a lifting-linkage, and power-operated mechanism comprising means for shifting the linkage across its "dead center" to cause it to automatically hold the structure raised and a device for shifting the linkage across its "dead-center" to release the structure and permit it to descend.

3. In a plow, the combination with a frame, carrying wheels and a plow-beam, a constantly driven element, a shaft, a driving connection between said element and said shaft, a clutch for controlling the operation of the shaft from said element, an automatic throw-off to render the clutch inoperative to drive the shaft, a self-locking linkage between the beam and the shaft adapted to pass the dead-center of the linkage, and means driven by the clutch for returning the linkage across the dead-center to release the beam.

4. In a plow, the combination with a frame, carrying-wheels, and a plow-carrying-structure, of a constantly driven shaft, an intermittently operated shaft for operating the structure, a driving-connection between said shafts, a clutch for controlling the operation of the intermittently operated shaft, an automatic throw-off for the clutch, a linkage between the structure and the shaft adapted to pass across the "dead-center" of the linkage to automatically hold the structure raised, and means on the intermittently operated shaft for shifting the linkage across the "dead-center" to release said mechanism and permit the structure to descend.

5. In a plow, the combination with a frame, carrying-wheels, and a plow-carrying structure, of a lifting-linkage comprising an arm and a lever, and power-operated mechanism comprising means for shifting the linkage across its "dead-center" to cause it to automatically hold the structure raised and a power-operated device for shifting the linkage across the "dead-center" to release the structure and permit it to descend.

6. In a plow, the combination with a frame, carrying-wheels, and a plow-carrying structure, of a lifting-linkage, comprising an arm, a lever and a link, and power operated mechanism comprising means for shifting the linkage across its "dead-center" to cause it to automatically hold the structure raised and a power-operated device for shifting the linkage across its "dead-center" to release the structure and permit it to descend.

7. In a plow, the combination with a frame, carrying-wheels, and a plow-carrying structure, of a constantly driven shaft, an intermittently operated shaft for operating the structure, a driving-connection between said shafts, a clutch for controlling the operation of the intermittently operated shaft, an automatic throw-off for the clutch, a linkage between the structure and the intermittently operated shaft adapted to pass across the dead center of the linkage to automatically hold the structure raised, and means operated by the intermittently operated shaft for shifting the linkage across the "dead-center" to release the linkage, and permit the structure to descend.

8. In a gang plow, the combination of a frame, a plow operatively connected with said frame and adapted to be raised and lowered relative thereto, a shaft, an arm carried around by said shaft, and means actuated by said arm upon each alternate rotation of said shaft for raising said plow, said arm upon each other alternate rotation of the shaft being adapted to be rotated past its coöperating raising means without engaging the same.

9. In a gang plow, the combination of a frame, a plow operatively connected with said frame and adapted to be raised and lowered relative thereto, a shaft, an arm revolubly mounted on said shaft, a pawl pivotally mounted on said arm, a link pivotally connected at its forward end to said arm and operatively connected at its rear end to said plow whereby a forward pull upon said link serves to raise said plow, and a second arm fixed upon said shaft adapted when said plow is in lowered position with the pawl in operative position to engage said pawl upon a rotation of said shaft and to swing said first-named arm forward for raising the plow.

10. In a plow, the combination with a frame, carrying wheels and a plow beam, of a shaft, mechanism including a clutch for driving said shaft from one of the carrying wheels, an automatic throw-off for the clutch to arrest the shaft after it has received limited rotation from said wheel, an arm pivoted on said shaft, a dog on said arm, means on the shaft for engaging the dog to operate the arm, a linkage between said arm and the beam, and means operated by the clutch for discharging the dog from said means when the beam has been raised.

11. In a plow, the combination with a frame, carrying-wheels and a plow-carrying structure, of a lifting-connection, a shaft having means thereon for alternately operating the connection to raise and lower the structure, a clutch for controlling the operation of the shaft, and an automatic throw-off for the clutch which becomes operative at the end of a complete revolution of said shaft, whereby said shaft will, during complete alternate revolutions, raise and lower the structures.

12. In a plow, the combination with a frame, carrying-wheels and a series of plow-carrying-structures, of a lifting-connection for each structure, a shaft having means thereon for alternately operating the connections to raise and lower the structures, a clutch for controlling the operation of the shaft, and an automatic throw-off for the clutch which becomes operative at the end of a complete revolution of said shaft, whereby said shaft will, during complete alternate revolutions, raise and lower the plows.

13. In a plow, the combination with a frame, carrying-wheels, and a plow-beam, of power-operated lifting mechanism comprising a clutch mounted on the frame, controlling-means for automatically rendering the clutch inoperative after limited revolution, a link connected to said beam, a pivoted arm to which the link is pivoted and means operated by said clutch for alternately operating the link to raise and to lower the beam.

14. In a plow, the combination with a frame, carrying-wheels, and a plow-carrying structure, of a power-operated shaft, a connection between said shaft and said structure comprising an arm pivoted on said shaft and a link connected to the structure and pivoted to said arm, means on said shaft for operating the connection to raise the structure and means also on said shaft for shifting the connection to lower the structure.

15. In a plow, the combination with a frame, carrying-wheels, and a plow-carrying structure, of a power-operated shaft, an arm pivoted on said shaft and a link between said arm and said structure, means on said shaft for operating the arm to raise the structure and means also on said shaft for shifting the link to lower the structure.

16. In a plow, the combination with a frame, carrying-wheels, and a plow-carrying structure, of a shaft, a connection between said shaft and said structure, means on said shaft for operating the connection to raise the structure, means also on said shaft for shifting the connection to lower the structure, a clutch for operating said shaft, an automatic throw-out for disengaging the clutch when said shaft has made a complete revolution and a controller for the clutch.

17. In a plow, the combination with a frame, carrying-wheels, a plow-beam and a gage-wheel, of a power-operated shaft, a connection between said shaft and said beam, means on said shaft for operating the connection to raise the beam and means also on said shaft for shifting the connection and cause the beam to be lowered, a clutch for operating said shaft, an automatic throw-out for disengaging the clutch when said shaft has made one complete revolution and a controller for the throw-out.

18. In a plow, the combination with a frame, carrying-wheels, and a plow-beam, of a shaft, an arm and a link between said shaft and said beam means on said shaft for operating the arm to raise the beam and means also on said shaft for shifting the link to lower the beam, a clutch for operating said shaft, an automatic throw-out for disengaging the clutch when said shaft has made a complete revolution and a controller for the throw-out.

19. In a plow, the combination with a frame, carrying-wheels, and a plow-carrying structure, of a power-operated shaft, an arm on said shaft, a dog on said arm, means on the shaft for engaging the dog to operate the arm, and a link-connection between the structure and said arm, said dog having means thereon for releasing it by gravity from the means on the shaft when the structure has been raised.

20. In a plow, the combination with a frame, carrying-wheels, and a plow-carrying structure, of a power-operated shaft, an arm on said shaft, a dog on said arm, means on the shaft for engaging the dog to operate the arm, a connection between the structure and said arm comprising a link, and means on the link for engaging the dog to hold it disengaged from the means on the shaft.

21. In a plow, the combination with a frame, carrying-wheels, and a plow-carrying structure, of a power-operated shaft, an arm on said shaft, a dog on said arm, means on said shaft for engaging the dog to operate the arm, a connection between the structure and said arm comprising a link, means on the dog for releasing it from means on the shaft, and means on the link for engaging and holding the dog to keep it disengaged from the means on the shaft.

22. In a plow, the combination with a frame, carrying-wheels, a plow-carrying structure, a lifting connection for said structure, and power operated mechanism for operating said connection to raise the structure and for imparting an initial movement to said connection, to release the structure for fall by gravity.

23. In a plow, the combination of a frame, carrying-wheels, a series of plow-carrying structures, a lifting-connection for each structure, and power-operated mechanism for operating said connections to raise the structures, and for imparting an initial movement to said connections to release the structure so they will drop by gravity after said initial movement.

24. In a plow, the combination with a frame, carrying-wheels, a plow beam, a shaft, a lifting connection between the beam and the shaft, a power-operated clutch for operating said shaft, an automatic throw-out for disengaging the clutch when the shaft has made one complete revolution, means on said shaft for operating the connection to raise the beam, and means on said shaft for imparting initial lowering movement to the connection, the latter being free to permit the beam to fall by gravity after said initial movement.

25. In a plow, the combination with a frame, carrying-wheels, and a plow-beam, of a power-operated shaft, an arm on said shaft, a dog on the arm, means on the shaft for engaging the dog to operate the arm in one direction, a connection between the beam and said arm comprising a link, means on the link for engaging the dog to release it from the shaft when the beam has been raised, and means on the shaft for engaging the link to release the beam.

26. In a plow, the combination with a frame, carrying-wheels, and a plow-carrying structure, of power-operated shifting mechanism, means for limiting descent of the structure, comprising two coöperating stop-members carried by the shifting mechanism, and means for adjusting one of the members.

27. In a plow, the combination with a frame, carrying-wheels, and a plow-beam, of power-operated shifting-mechanism comprising a link, means for limiting the link to limit descent of the beam, and means for adjusting said limiting means, said link being operative to raise the beam independently of the limiting means.

28. In a plow, the combination with a frame, carrying-wheels, and a plow-carrying structure, of power-operated lifting-mechanism connected to said structure, a device for limiting the lowering movement of the structure, comprising a pair of coöperating stop-members, one of which is slidably mounted on the lifting mechanism, and means for adjusting said device.

29. In a plow, the combination with a frame, carrying-wheels, and a plow-beam, of power-operated lifting-mechanism, comprising a link connected to the beam and a device for limiting the movement of the link in lowering the beam slidably connected to the link.

30. In a plow, the combination with a frame, carrying-wheels, and a plow-carrying structure, of power-operated lifting-mechanism for said structure, a device for limiting the descent of the structure, comprising coöperative stop-members mounted on the lifting mechanism, and a lever connected to one member of said limiting-means, said mechanism being operable to raise the structure independently of the limiting-means and lever.

31. In a plow, the combination with a frame, carrying-wheels, and a plow beam, of a connection for lifting the beam, power-operated mechanism for operating the connection to lift the beam, a device for limiting the descent of the beam, and a lever connected to said limiting device, said connection being operable to raise the beam independently of the lever, the lever being operable to shift the connection to raise the beam.

32. In a plow, the combination with a frame, carrying-wheels and a plow beam, of a self-locking lifting linkage, power-operated mechanism carried by the frame for shifting the linkage to a position in which it will be self-locking to hold the beam raised, means for locking the linkage to hold the structure raised before it reaches the self-locking position, the linkage permitting the beam to drop by gravity when the locking-means is released, and means for rendering the locking-means operative and inoperative to hold the linkage.

33. In a plow, the combination with a frame, carrying-wheels and a plow-carrying structure, of an automatically locking lifting connection, power-operated means for shifting the connection to automatically hold the structure raised, a lever connected to the lifting connection, means for locking the lever into position to hold the structure raised before the connection is automatically locked, so that the structure will drop by gravity when the lever is released, and power-operated means for releasing the connections when automatically locked.

34. In a plow, the combination with a frame, carrying-wheels, and a plow-carrying structure, of an automatically locking lifting-connection, power-operated means for shifting said connection to automatically hold the structure raised, a lever for operating the structure, and means for locking the lever to hold the structure raised before the connection is automatically locked, so that the structure will drop by gravity when the lever is released, said lever being operable to lock the connection.

35. In a plow, the combination with a frame, carrying-wheels and a plow-carrying structure, of an automatically locking lifting connection, power-operated means for shifting the connection to automatically hold the structure raised, a lever connected to the connection, means for locking the lever into position to hold the structure raised before the connection is automatically locked, so that the structure will drop by gravity when the lever is released, and power-operated means for releasing the connections when automatically locked, said lever being operable to lock the connection.

36. In a plow, the combination with a frame, carrying-wheels and a plow-carrying structure, of a lifting-linkage, power-operated means for shifting the linkage across its dead-center to cause it to automatically hold the structure raised, means for operating the structure manually, and means for locking the linkage in position to hold the structure raised before the linkage crosses its dead-center when raised by the manual-means.

37. In a plow, the combination with a frame, carrying-wheels and a series of plow-carrying structures, of a lifting-linkage for each structure, power-operated means for individually shifting the linkages to cause each to automatically hold its structure raised, means for manually operating each structure and means for locking each linkage in position to hold its structure raised before the linkage reaches its automatically holding position, when the structure is raised manually.

38. In a plow, the combination with a frame, carrying-wheels, and a plow-beam, of power-operative lifting-mechanism for said beam, comprising a link, a device for limiting the descent of the structure, and a lever for adjusting said limiting-means, the link being operable to raise the structure independently of the limiting-means, the latter means being slidably connected to the link.

39. The combination of a frame, a plow-carrying structure, a lifting-connection for the structure, a shaft, power-operated means for imparting limited movement to the shaft, said connection comprising an arm pivoted on the shaft and a link connected to said arm, means on the shaft for operating the connection to raise the structure, means whereby the connection will be locked to hold the structure raised and a releasing tappet on said shaft.

40. The combination of a frame, a plow-carrying structure, a lifting connection for the structure, a shaft having a single tooth thereon, said connection comprising an arm pivoted on the shaft and a link pivoted to the arm, a dog pivoted on the arm and adapted to be operated by said tooth to raise the structure, a tappet on the shaft for releasing the connection, and power-operated means for imparting limited movement to the shaft.

41. The combination of a frame, a plow-carrying structure, a lifting connection for the structure, a shaft having a single tooth thereon, said connection comprising an arm pivoted on the shaft and a link pivoted to the arm, a dog pivoted on the arm and adapted to be operated by said tooth to raise the structure, a tappet on the shaft for releasing the connection, and power-operated means for imparting limited movement to the shaft, said tappet and tooth being brought into operative relation to the connection during alternate revolutions of the shaft.

FRANK E. DAVIS.
WILLIAM W. CAMERON.

Witnesses:
C. W. DICKINSON,
O. V. KELLY.